H. H. COBE.
SEPARABLE FASTENER.
APPLICATION FILED JUNE 28, 1917.

1,268,927.

Patented June 11, 1918.

Inventor.
Harry H. Cobe
by Heard Smith & Tennant.
Attys.

UNITED STATES PATENT OFFICE.

HARRY H. COBE, OF BOSTON, MASSACHUSETTS, ASSIGNOR TO BURD RING SALES COMPANY, OF BUFFALO, NEW YORK, A CORPORATION OF NEW YORK.

SEPARABLE FASTENER.

1,268,927.

Specification of Letters Patent. Patented June 11, 1918.

Application filed June 28, 1917. Serial No. 177,582.

*To all whom it may concern:*

Be it known that I, HARRY H. COBE, a citizen of the United States, residing at Boston, county of Suffolk, State of Massachusetts, have invented an Improvement in Separable Fasteners, of which the following description, in connection with the accompanying drawing, is a specification, like characters on the drawing representing like parts.

This invention relates to separable fasteners comprising a socket member and a stud member adapted to be entered into the socket member and locked therein, and particularly to fasteners of this type which are provided with means for automatically ejecting the stud from the socket member when the stud is released.

The object of the present invention is to provide a stud-ejecting means which is carried by or associated with the stud member.

In order to give an understanding of my invention, I have illustrated in the drawings some selected embodiments thereof which will now be described, after which the novel features thereof will be pointed out in the appended claims.

In the drawings, Figure 1 is a vertical section through a fastener embodying my invention;

Figure 4:
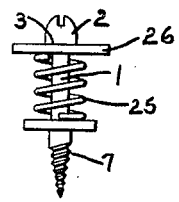
Figs. 4 and 5 are views showing two different types of stud members embodying my invention.
Figure 5:
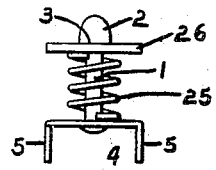

The stud member comprises a base portion from which extends a stud having a shank 1 and head 2, the head being shaped to present locking shoulders 3 on the under side thereof. The body to which the stud member is secured may have various shapes without departing from my invention. In Fig. 5 I have shown a stud member in which the body is in the form of a plate or disk 4 having attaching prongs 5 extending therefrom which may be inserted through the material or part 6 to which the stud member is to be fastened and may then be clenched over to lock the stud member in place. In Fig. 4 I have shown a construction wherein the body of the stud member is in the form of a screw 7 which may be screwed into the part to which the stud member is to be secured.

The socket member is shown as having a casing comprising the shell 8 and the disk 9, said disk forming the bottom of the casing. This disk 9 is provided with a stud-receiving aperture 10 and the top of the shell is also provided with an aperture 11 through which the head of the stud may project. The disk 9 is retained in the shell by means of fingers 12 formed on the shell and which are bent to overlie the underside of the disk. The socket member may be secured to the part or material 13 to which it is to be attached in any suitable way, as, for instance, by means of attaching prongs 14.

Figure 2:
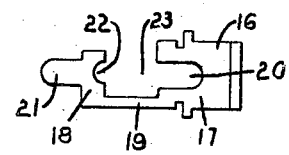
Fig. 2 is a view of one of the stud-retaining members.
Figure 3:
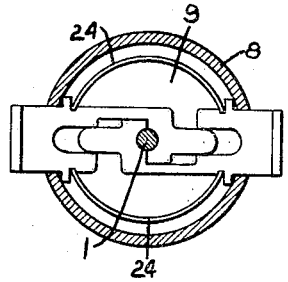
Fig. 3 is a section on the line 3—3, Fig. 1.

15 and 16 indicate two oppositely-disposed stud-retaining members which are slidably mounted in the casing. While these members might have any suitable construction, I prefer to make them duplicates, and each of the shape shown in Fig. 2. Each retaining member is formed with the body portion 17 and with the stud-engaging portion 18 which is connected to the body portion by the connecting portion 19. Each body portion is also formed with a guiding slot 20 and the stud-engaging portion is provided with a guiding finger 21 and also with the stud-receiving notch 22. With this construction when the two stud-retaining members are in position the stud-engaging portion 18 of each member occupies the opening 23 of the other member, and the guiding finger 21 of each member is slidably received in the slot 20 of the other member. The two stud-retaining members are acted upon by springs 24 which tend normally to move them into operative locking position. The stud may be released by simply pressing inwardly on the outer ends of the stud-retaining members.

The present invention relates particularly to means for automatically ejecting the stud from the socket member when the stud-retaining members are manipulated to unlock the stud, and it comprises a stud-ejecting member which is permanently carried by the stud member instead of by the socket member. A simple device adapted for this purpose is shown in the drawings and comprises a stud-ejecting spring 25 which encircles the shank 1 of the stud and is confined between the body thereof and a collar 26 loosely mounted on the stud.

The collar 26 is retained on the stud when the latter is withdrawn from the socket member by engagement with the shoulder 3 of the stud and the spring 25 is thus permanently secured to the stud.

Figure 1:
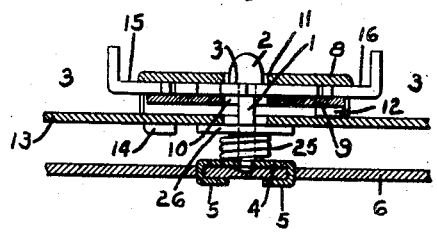

When the stud is inserted into the socket member, the collar 26 will engage either the socket member or the material 13 and the spring 25 will be compressed, as shown in Fig. 1. When the stud-retaining members 15 and 16 are manipulated to unlock the stud, the resiliency of the spring 25 will serve to withdraw the stud from the socket member automatically.

While I have illustrated herein some selected embodiments of my invention, yet I do not wish to be limited to the constructional features shown.

I claim:

1. In a separable fastener, the combination with a stud member, of a socket member, stud-retaining means carried by the socket member, and means permanently carried by the stud member for automatically withdrawing the stud from the socket member when the stud is released.

2. In a separable fastener, the combination with a stud member, of a socket member, stud-retaining means carried by the socket member, a stud-ejecting spring carried by the stud member, and means to retain said spring on the stud member when the latter is separated from the socket member.

3. In a separable fastener, the combination with a stud member, of a socket member, stud-retaining means carried by the socket member, resilient means carried by the stud member for withdrawing the latter from the socket member when said stud member is released, and means to retain said resilient means on the stud when the latter is withdrawn from the socket.

4. In a separable fastener, the combination with a stud member, of a socket member, stud-retaining means carried by the socket member, a spring encircling the shank of the stud and placed under tension when the stud is entered into the socket member, and means to retain the spring on the stud when the latter is withdrawn from the socket member.

5. In a separable fastener, the combination with a stud member having a shank and a head, of a socket member, stud-retaining means carried by the socket member, a spring encircling the shank of the stud, and a collar loosely mounted on the shank and confined between the head of the stud and the spring whereby when the stud is inserted into the socket member the latter engages the collar and places the spring under tension.

In testimony whereof, I have signed my name to this specification.

HARRY H. COBE.

Copies of this patent may be obtained for five cents each, by addressing the "Commissioner of Patents, Washington, D. C."